(12) United States Patent
Gorelik et al.

(10) Patent No.: US 6,651,142 B1
(45) Date of Patent: Nov. 18, 2003

(54) METHOD AND APPARATUS FOR PROCESSING DATA USING MULTI-TIER CACHING

(75) Inventors: Vladimir Gorelik, Palo Alto, CA (US); Glenn A. Shapland, Santa Clara, CA (US); Craig R. Powers, San Carlos, CA (US)

(73) Assignee: Sagent Technology, Mountain View, CA (US)

( * ) Notice: Subject to any disclaimer, the term of this patent is extended or adjusted under 35 U.S.C. 154(b) by 0 days.

(21) Appl. No.: 09/565,874

(22) Filed: May 5, 2000

(51) Int. Cl.[7] ............................................... G06F 13/00
(52) U.S. Cl. ..................... 711/119; 711/122; 711/132
(58) Field of Search ................................. 711/119, 122, 711/132

(56) References Cited

U.S. PATENT DOCUMENTS

| | | | | |
|---|---|---|---|---|
| 5,666,514 A | * | 9/1997 | Cheriton | 711/141 |
| 5,701,451 A | * | 12/1997 | Rogers et al. | 707/1 |
| 5,793,964 A | * | 8/1998 | Rogers et al. | 709/202 |
| 5,826,239 A | * | 10/1998 | Du et al. | 705/1 |
| 5,925,100 A | * | 7/1999 | Drewry et al. | 709/203 |
| 5,930,794 A | | 7/1999 | Linenbach et al. | 707/100 |
| 6,038,558 A | | 3/2000 | Powers et al. | 707/2 |
| 6,073,129 A | * | 6/2000 | Levine et al. | 707/10 |
| 6,151,601 A | * | 11/2000 | Papierniak et al. | 707/1 |
| 6,161,102 A | | 12/2000 | Yanagihara et al. | |
| 6,216,169 B1 | | 4/2001 | Booman et al. | |
| 6,279,033 B1 | | 8/2001 | Selvarajan et al. | |
| 6,317,737 B1 | * | 11/2001 | Gorelik et al. | 705/30 |
| 6,343,286 B1 | | 1/2002 | Lee et al. | |
| 6,393,423 B1 | | 5/2002 | Goedken et al. | |

\* cited by examiner

Primary Examiner—Reba I. Elmore
(74) Attorney, Agent, or Firm—Blakely, Sokoloff, Taylor & Zafman

(57) ABSTRACT

A method and apparatus for processing data using multi-tier caching are described. In one embodiment, the method includes receiving a user request containing one or more data parameters and searching cache memories of multiple tiers until finding a parameterized result set associated with the data parameters. The multiple tiers correspond to stages in the transformation of data retrieved from one or more data sources according to the user request. Once the parameterized result set associated with the data parameters is found, it is used to create a final result set.

23 Claims, 14 Drawing Sheets

METHOD AND APPARATUS FOR PROCESSING DATA USING MULTI-TIER CACHING

FIELD OF THE INVENTION

The present invention relates to the field of processing data; more particularly, the present invention relates to processing data using multi-tier caching.

BACKGROUND OF THE INVENTION

To be successful in today's economy, companies must have fast access to various sources of information. It is critical for an enterprise to be able to extract, transform, move, stage, and present key information across all points of the enterprise. This may require consolidating different types of information from multiple back-end systems and analyzing that data over a networked environment, such as the Internet. Typically, providing information over the World-Wide Web (herein after "the web") is a costly and time-consuming effort, and the results are rarely optimized for the Internet.

Existing tools do not allow much flexibility in transforming various kinds of information into customized result sets (e.g., charts, spreadsheets, reports, etc.). For example, a report created for one user is typically used by this specific user only. Other user requests for a similar report are processed anew. In addition, formation of the report, including grouping and pagination of report records, is typically performed on a client machine, thereby increasing the amount of data being sent to the client machine and delaying the delivery of the report to the user.

Furthermore, when a page of a result set contains a value that cannot be computed until subsequent pages are processed, this page is not built until the value is computed. For example, if a first report page contains a grand total which cannot be computed until the entire report is built, the user does not see the first report page until all the report pages are created. It is not uncommon for an enterprise report to include more than 1,000 pages. For a report of such length, the waiting time may be significant and may seriously affect the speed of delivering the report to the user.

Therefore, what is needed is a data processing tool which enables rapid creation and distribution of customized result sets to the users.

SUMMARY OF THE INVENTION

A method and apparatus for processing data using multi-tier caching are described. In one embodiment, a user request to process data is received. The user request includes one or more data parameters. Cache memories of a plurality of tiers are then searched until a parameterized result set associated with the data parameters is found. Further, the parameterized result set is processed to create a final result set.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
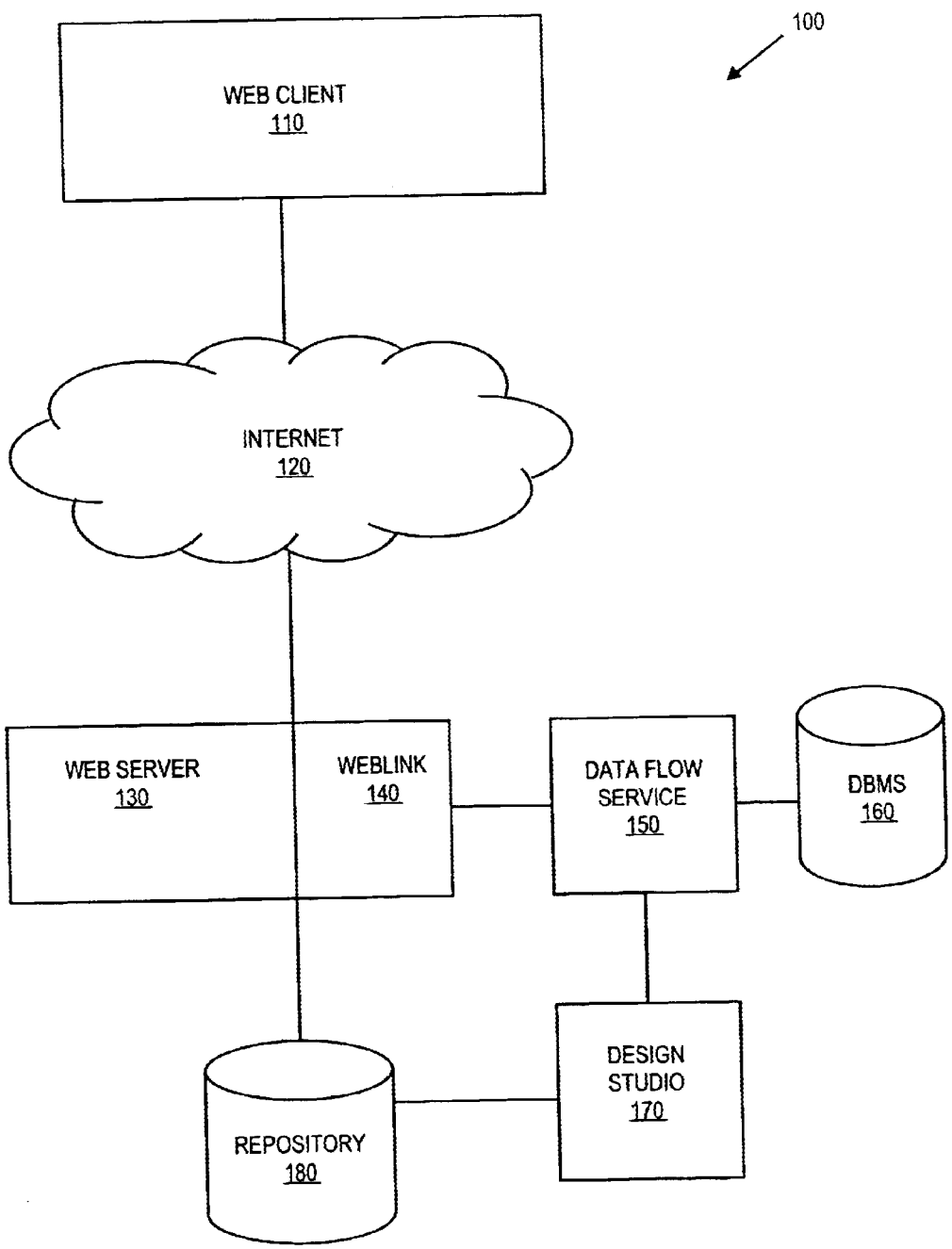
FIG. 1 is a block diagram of one embodiment of a system for processing data.

A method and apparatus for processing data using multi-tier caching are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as, for example, bits, values, elements, symbols, characters, terms, or numbers.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disk read-only memory (CD-ROMs), and magnetic-optical disks, read-only memories (ROMs), random access memories (RAMs), erasable programmable read-only memories (EPROMs), electrically erasable programmable read-only memories (EEPROMs), magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview

FIG. 1 is a block diagram of one embodiment of a system for processing data. Referring to FIG. 1, a web client 110, a web server 130, a data flow service 150, a database management system (DBMS) 160, a repository 180, a design studio 170, and a wide area network (e.g., Internet) 120 are shown.

The DBMS 160 includes a subsystem for accessing and analyzing existing data. In one embodiment, the DBMS 160 includes a data warehouse where corporate data is consolidated and fed to smaller data warehouses (called data marts). Alternatively, the data warehouse and data mart functions are both performed by the DBMS 160. Data may be stored in a relational database such as, for example, a Microsoft SQL Server database, an Oracle database, a Sybase databse or DB2. Alternatively, data may be stored in a flat-file database, network database, or a hierarchical database.

The DBMS 160 communicates with the data flow service 150. The data flow service 150 provides a set of services to process user requests for information stored by the DBMS 160. In one embodiment, the data flow service 150 employs software agents that can perform multiple tasks simultaneously and in the background, thereby allowing users to submit several requests at once, or to work on other tasks while user requests are executed.

The data flow service 150 runs plans specified by the user. In one embodiment, a plan graphically represents to the user the process of accessing, transforming and loading data. The plan may define the steps to perform a request and view the data. For example, the plan may include a data source step, a data transform step, and a data viewing step. Alternatively, plans can be created to batch load data into database tables of DBMS 160.

In one embodiment, individuals create plans using the design studio 170. The design studio 170 may be connected to the data flow service over a network. The design studio 170 provides an intuitive and graphical environment for developing plans. A user can create a new plan or use an existing plan. In addition, pre-built plan portions can be used to create a customized plan that satisfies the user's requirements. When a plan is created, it is stored in the repository 180. The repository 180 also stores various data set definitions and metadata defining a database structure. The repository 180 is coupled to the design studio 170 and the web server 130. Information (e.g., a plan) in the repository 180 may be requested by either a user of the design studio 170 or by the web server 130 upon a request of a user of the web client 110. The user may request to have the information presented in various forms, including, but not limited to, a report, a chart, or a spreadsheet. Alternatively, the user may request to load data to a database. For example, the user may specify a source for the data, its hierarchical structure and a destination for loading the hierarchical data.

The web client 110 connects to the wide area network 120. Client 110 represents any device that may enable a user's online activity over a network. Such devices may include, for example, a conventional computer system, a network computer or a thin client device (e.g., WebTV Networks™ Internet terminal or Oracle™ NC), a laptop computer or palm-top computing device (e.g., Palm Pilot™), a cellular phone, a "kitchen computer", etc. In one embodiment, client 110 may use a client application program known as a web browser such as the Netscape™ Navigator™ published by Netscape Corporation of Mountain View, Calif., the Internet Explorer™ published by Microsoft Corporation of Redmond, Wash., the user interface of America On-Line™, or the web browser or HTML translator of any other supplier. Using such conventional browsers and the World-Wide Web, client 110 may access graphical data, textual data, video, audio or tactile data provided by the web server 130.

The web client 110 communicates with the web server 130 via the wide area network 120. The wide area network 120 may include, for example, the Internet, America On-Line™, CompuServe™, Microsoft Network™, or Prodigy™. The web server 130 is, in turn, coupled to the repository 180 and the data flow service 150.

In one embodiment, the web server 130 includes a web link 140. The web link 140 is an information-access tool that allows users of the web client 110 to access and analyze items from the repository 180. In one embodiment, the web link 140 includes pre-built web pages that provide a user interface for viewing and executing plans stored in the repository 180. When a user clicks on a hypertext link for a specific plan, the web link 140 receives the request, retrieves the plan from the repository 180, and passes it to the data flow service 150 for execution. In one embodiment, the data flow service 150 obtains data from the DBMS 160, transforms it according to the plan, and sends it to the web server 130. The web server 130 then repackages the transformed data and transmits it to the web client 110 which generates a final data set for display to a user.

Multi-Tier Caching

Figure 2:
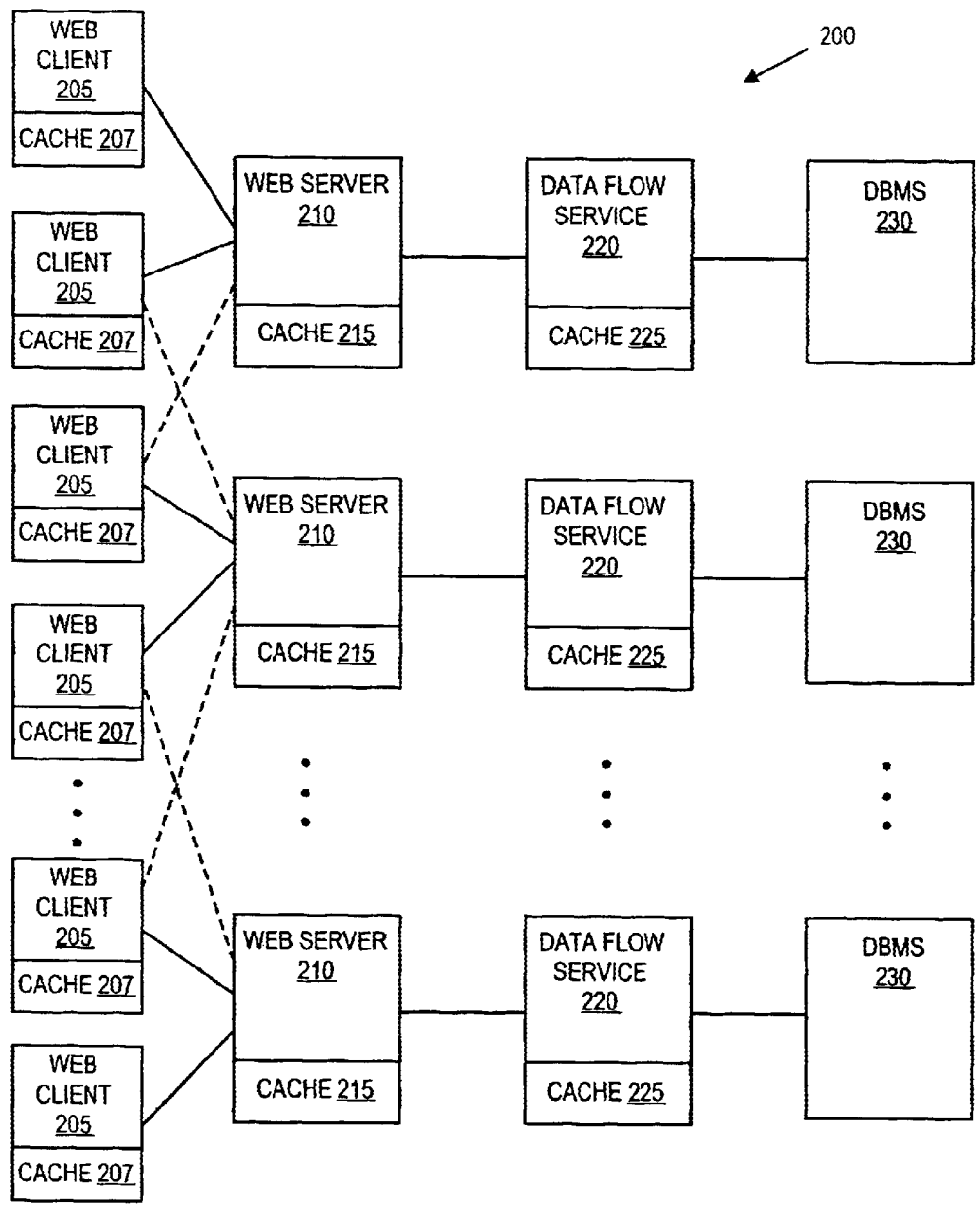
FIG. 2 is a block diagram of one embodiment of a system for processing data using multi-tier caching.

FIG. 2 is a block diagram of one embodiment of a system for processing data using multi-tier caching. Multi-tier caching improves efficiency of processing data by enabling a user to access a result set previously created in response to a request of another user. For example, if one user requests weekly sales data from a data mart, the next user requesting the same sales data can receive the results back without re-executing the request.

Referring to FIG. 2, multiple chains are shown. Each chain includes a number of tiers performing pre-assigned tasks. In one embodiment, the tiers in the chain include a data flow service 220, a web server 210, and one or more clients 205. In one embodiment, each tier in the chain performs a specific data processing task.

In one embodiment, the user request is a request to execute a specific plan. The plan may identify a data source, a hierarchical structure of the data and other data transformation features, and specify viewing options. The data flow service 220 transforms the set of data according to the plan or other information in the user request and creates a data flow result set. The web server 210 creates a web server result set by adding instructions enabling the web client 205 to create a final result set which is displayed to the user. Alternatively, the user may request to retrieve data from one source(s), transform it and load the transformed data to a different source, as described above. In this embodiment, the data flow result set is transferred to the DBMS 160 to be loaded to a destination database.

In one embodiment, in each chain, every tier has a cache for storing corresponding parameterized result sets. A parameterized result set is created at each tier using one or more parameters and is stored in the cache with these parameters. In one embodiment, the parameters represent the key of the result set. A parameter may be, for example, a specific geographic location (e.g., a state, a city, a county, etc.), a date, an account number, a division, or any other criterion.

In one embodiment, each client 205 has a cache 207 for storing final parameterized result sets. The client 205 issues a user request to process data and displays a final result set to the user. A user request includes one or more data parameters. Before transmitting a user request to the web server 210 (in the same chain), the client 205 searches the cache 207 for a final result set associated with the data parameters. If the final result set is found, the client 205 displays it to the user. In one embodiment, the user specifies one or more pages of the final result set that the user wants to see. In this embodiment, only the specified pages are retrieved from the cache 207 and displayed to the user.

If the final result set associated with the data parameters is not found in the cache 207, the client 205 transmits the user request to the web server 210 over the wide area network. The web server 210 has a cache 215 for storing parameterized web server result sets. Upon receiving the user request, the cache 215 is searched for the data parameters. If the data parameters are found, the web server result set associated with the parameters is retrieved from the cache 215 and sent to the client 205. The client 205 creates a final result set and displays it to the user. In addition, the client 205 stores the final result set with the parameters in the cache 207.

In one embodiment, only a predefined group of users can access a corresponding cache to maintain security. In addition, each user can only access the portion of the cache that contains result sets that may be shared within this user's group.

In one embodiment, if the parameters are not found in the cache 215, the user request is sent to a next tier, i.e. the data flow service 220. In an alternate embodiment, access to the cache 215 is not limited to the above group of clients 205. In this embodiment, if the data parameters are not found in the cache 215, the user request is sent to a web server 210 in the next chain, etc. If none of caches 215 contain the data parameters, the user request is sent to a next tier in the initial chain, i.e. the data flow service 220.

Upon receiving the user request, the data flow service 220 searches the cache 225 for the data parameters. If the data parameters are found, an associated data flow result set is retrieved from the cache 225. This data flow result set is then sent to the web server 210 where it is processed to create a web server result set. The web server result set is transmitted to the client 205 and a copy of the web server result set is stored with the parameters in the cache 215. The client 205 utilizes the web server result set to generate a final result set for a display to the user. A copy of the result set is stored with the parameters in the client's cache 207.

If the result set associated with the parameters requested by the user is not found in the cache 225, the data flow service 225 re-executes the user request and creates a new data flow result set according to the user request. This data flow result set is sent to the web server 210 and a copy of the data flow result set is stored in the cache 225. The web server 210 performs its task, creating a web server result set. The web server result set is transmitted to the client 205, and a copy of the web server result set is stored in the cache 215. The client 205 then generates a final result set and stores its copy in cache 207. The process of executing the user request when the data parameters are not found in any of the above caches is described in greater detail below in conjunction with FIG. 3.

In one embodiment, caches 207, 215 and 225 are searched in parallel. In this embodiment, if parameterized result sets are found in all of the caches 207, 215 and 225, a parameterized result set is retrieved from the web client 205 for display to the user. If parameterized result sets are found in both caches 215 and 225, but not in the cache 207, a parameterized result set is retrieved from the web server cache 215 and transmitted to the web client 205. The web client 205 then creates a final result set for display to the user and stores the final result set in the cache 207. If a parameterized result set is only found in cache 215, and not in any of the caches 215 and 207, a parameterized result set is retrieved from the data flow cache 225 and transmitted to the web server 210. The web server creates a web server result set, stores it in the cache 215 and sends it to the web client 205. The web client 205 then creates a final result set for display to the user and stores the final result set in the cache 207.

In one embodiment, a parameterized result set can be stored in a corresponding cache during a predefined time period. In this embodiment, upon expiration of the predefined time period, the parameterized result set is automatically refreshed, i.e. replaced by a new result set created using the parameters of the expired result set. Alternatively, when the predefined time period expires, the content of the entire cache is refreshed and all parameterized result sets within the cache are re-created.

In another embodiment, a cache or a particular result set may be refreshed upon receiving an instruction from an individual. For example, a database administrator, knowing that new data is being entered into a database, may request to re-create all result sets that were generated based on the data in this database.

Figure 3:
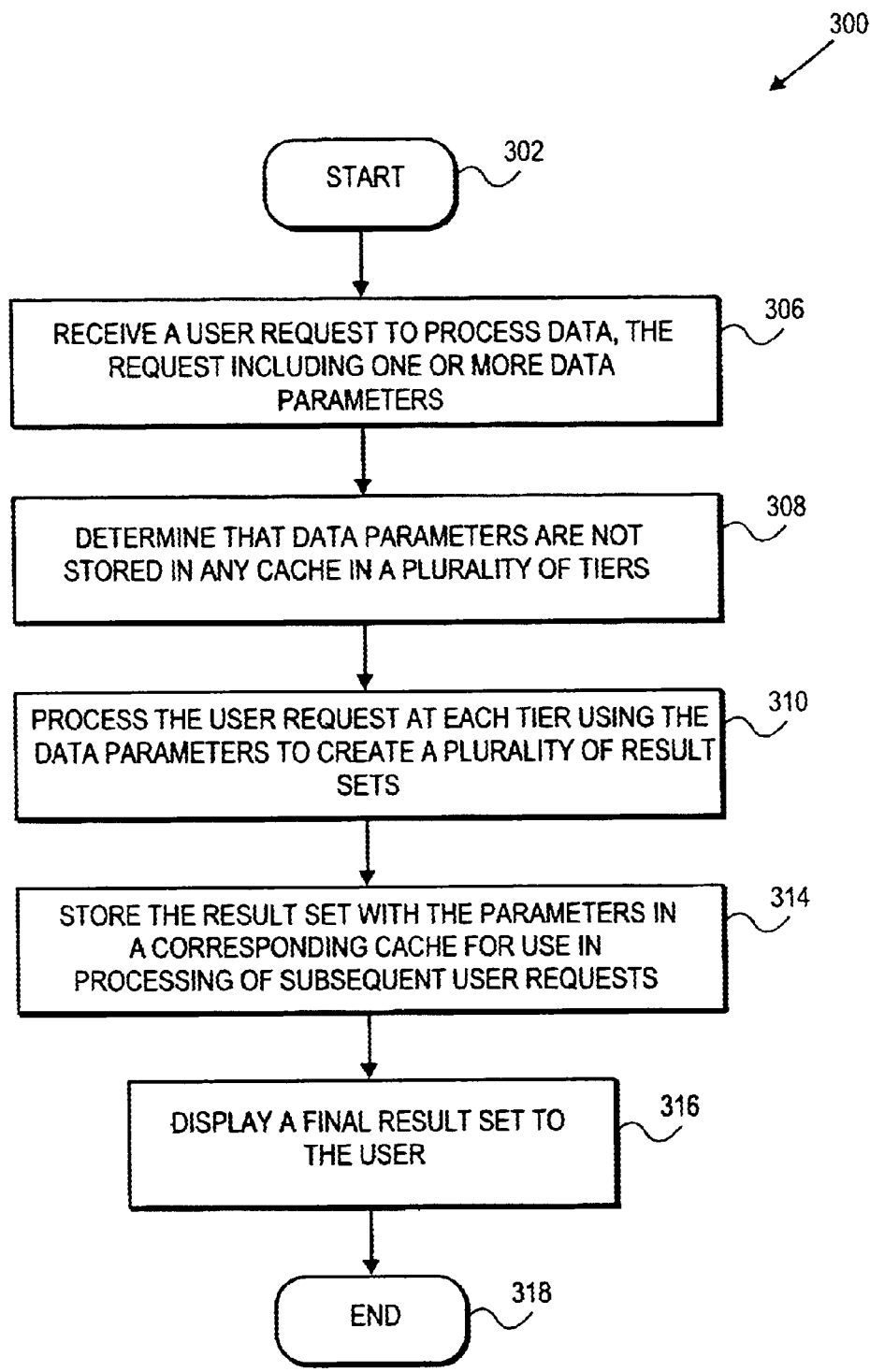
FIG. 3 is a flow diagram of one embodiment of a process for executing a user request to process data.

FIG. 3 is a flow diagram of one embodiment of a process for executing a user request to create a final result set. The process is performed by processing logic, which may comprise hardware, software, or a combination of both. The processing logic may be in any or all of client 205, web server 210, data flow service 220, or partially or entirely in a separate device and/or system(s).

Referring to FIG. 3, the process begins with receiving a user request to process data (processing block 306). The user request includes one or more data parameters. In one embodiment, the user request identifies a plan to be used for processing the data.

Next, the process continues with determining that the data parameters are not stored in caches of multiple tiers (processing block 308). In one embodiment, the multiple tiers include a first tier for initial processing of user requests, a second tier for intermediate processing, and a third tier for final processing of user requests. The first tier is one or more processes running on the data flow service 220, the second tier is represented by one or more processes running on the web server 210, and the third tier is one or more processes running on the web client 205. Each tier has a corresponding cache. In one embodiment, the caches are searched sequentially, beginning with the cache 207 and completing with cache 225. Alternatively, the caches are searched in parallel as described in greater detail above.

Further, each tier processes the user request using the data parameters to create a result set (processing block 310) and stores the result set with the data parameters in a corresponding cache (processing block 314) for use in processing of subsequent user requests. Afterwards, a final result set is displayed to the user (processing block 316). In one embodiment, one page at a time is displayed to the user.

Figure 4:
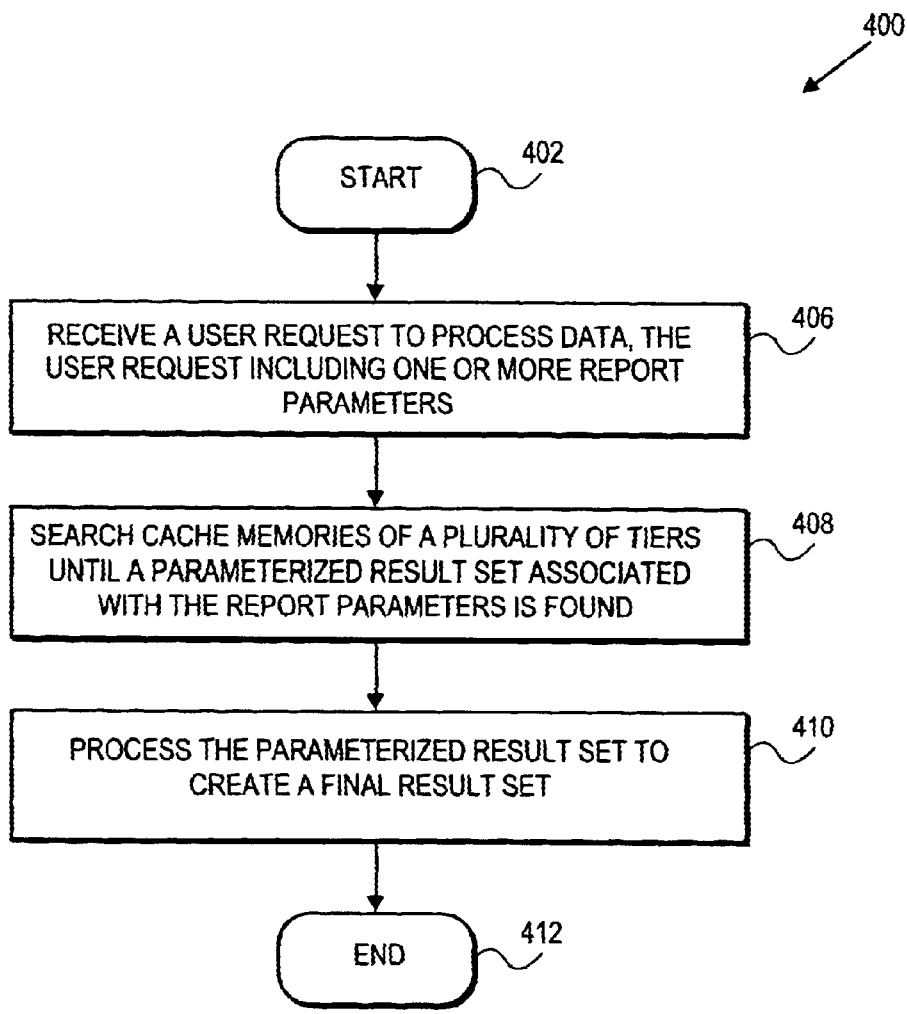
FIG. 4 is a flow diagram of one embodiment of a process for producing a final result set using multi-tier caching.

FIG. 4 is flow diagram of one embodiment of a process for producing a final result set using multi-tier caching. The process is performed by processing logic, which may comprise hardware, software, or a combination of both. The processing logic may be in any or all of client 205, web server 210, data flow service 220, or partially or entirely in a separate device and/or system(s).

Referring to FIG. 4, the process begins with receiving a user request to process data (processing block 406). The user request includes a data parameter (e.g., a specific state, city, date, etc.). In one embodiment, the user request includes two or more parameters. The user request may identify a plan to be executed to process the data.

Next, cache memories of multiple tiers are searched until a parameterized result set associated with the data parameter is found (processing block 408). The tiers are described in more detail above. Each tier has a corresponding cache for storing parameterized result sets. A parameterized result set is created at a corresponding tier based on the data parameters included in the user request. In one embodiment, the data parameters represent a key that identifies the result set in the cache. In one embodiment, each parameterized result set was dynamically placed in a cache when a user request was processed at a corresponding tier. In one embodiment, the search begins with a cache of the third tier (the web client 205) and, if the identified result set is not found, the search continues towards a cache of the first tier (the data flow service 220).

In one embodiment, the user request is processed at tiers whose caches did not contain the data parameter. Although not necessary, in one embodiment, a sequence of tiers for the processing is reverse to a sequence of tiers for the searching. Each tier creates a result set which is passed to a next tier for further processing. Result sets are saved in corresponding caches for use in processing of subsequent user requests.

Afterwards, at processing block 410, the final result set is created. In one embodiment, a parameterized result set is stored in a cache with a page index. If a user wishes to view a particular page or pages of the result set, the page index is utilized to retrieve the desired pages from the cache and to display only this page or pages to the user. As a result, the user does not need to scroll through numerous pages to view a required page. In addition, the amount of data transmitted to the client 205 over the wide area network is reduced, thereby improving performance of the data distribution process.

Pending Results

Figure 5:
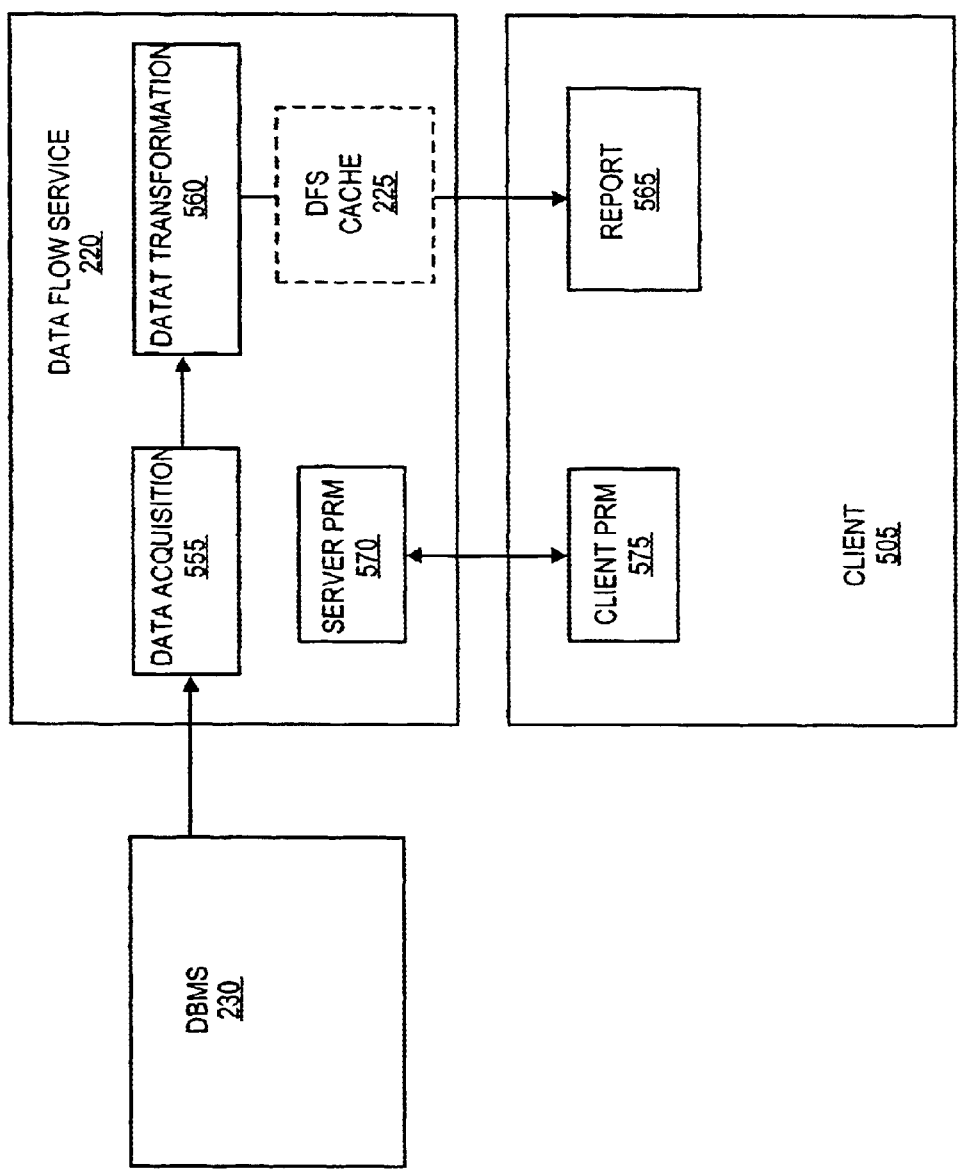
FIG. 5 is a block diagram of one embodiment of a system for producing a data set with pending results.

FIG. 5 is a block diagram of one embodiment of a system for producing a data set with pending results. Referring to FIG. 5, a DBMS 230, a data flow service 220, and a client 505 are shown. The functions of the DBMS 230 and the data flow service 220 are described in detail above in conjunction with FIGS. 1 and 2. The data flow service 220 communicates with the client 505. In one embodiment, the client 505 represents a design studio which allows the user to create a new plan, or select or modify an existing plan. The plan is then passed to the data flow service 220 which executes the plan, creates a result set 565, and sends the result set 565 back to the design studio for a subsequent display to the user. In this embodiment, the client 505 communicates with the data flow service over a network.

Alternatively, the client 505 may represent a browser on a client device such as the web client 205 in FIG. 2. In yet another embodiment, the client 505 may represent a web server, i.e., the web server 210 in FIG. 2. In this embodiment, the web server 210 acts as a client of the data flow service 220. The web server 210 sends user requests to process data (received from an actual client) to the data flow service 220 and receives back the result sets 565. The web server 210 reformats these result sets and transmits them to the actual client over the wide area network.

In one embodiment, the data flow service 220 includes a data acquisition component 555 and a data transformation component 560. The data acquisition component 555 obtains a set of data requested by the user from one or more databases of the DBMS 230. The data transformation component 560 transforms the obtained set of data according to the user request and creates the data flow result set 565. In one embodiment, the user request identifies a plan to be used for processing the data. The plan may specify a data source (s), data transformation requirements (e.g., a conversion of English pounds to American dollars, data grouping, pagination, etc.), and data viewing requirements (e.g., where the data flow result set 565 should be output). In one embodiment, the data flow result set is saved in a data flow service (DFS) cache 225 for use in processing of subsequent user requests.

Figure 6:
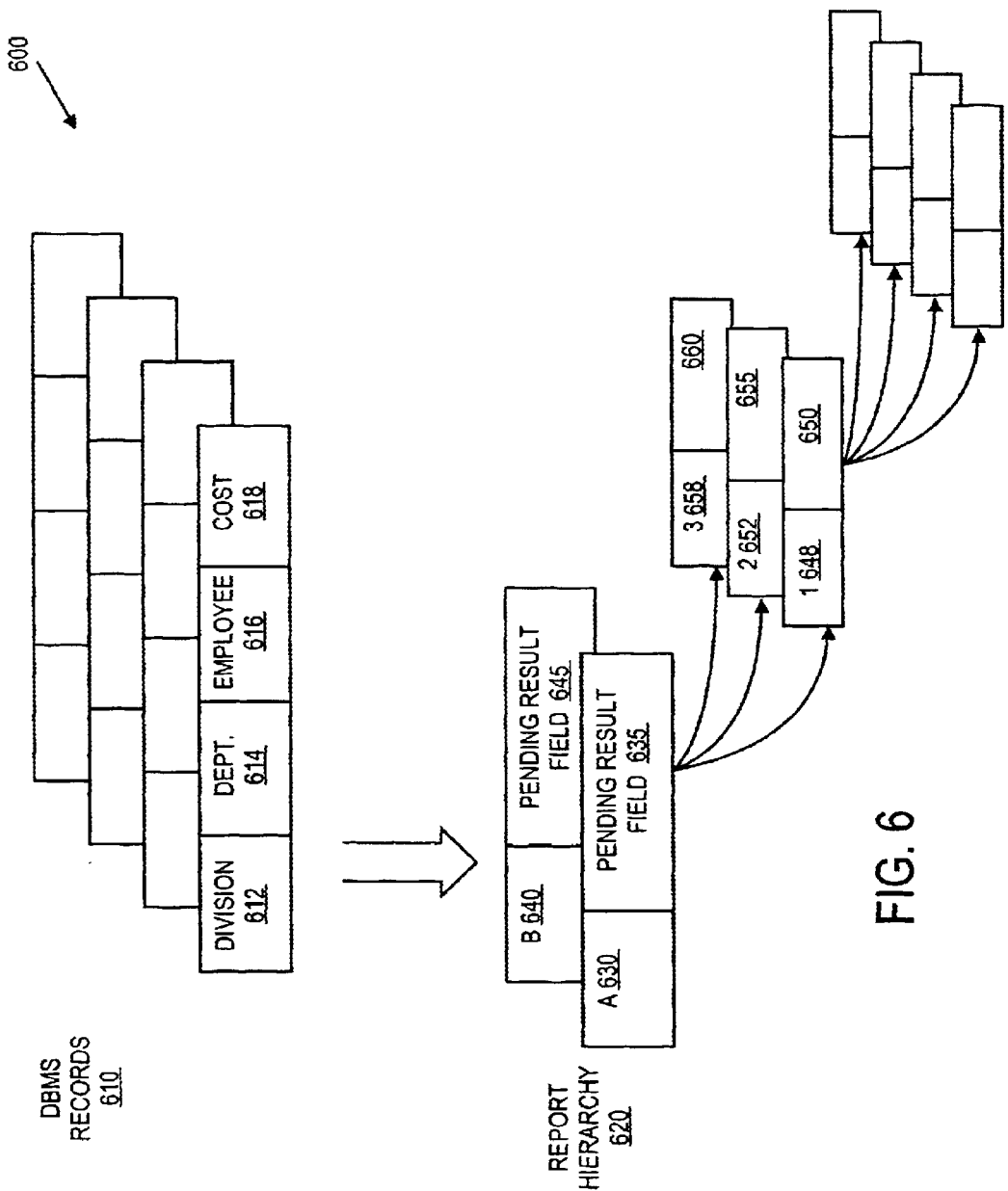
FIG. 6 illustrates a sample report with pending results.

In one embodiment, the data flow service 220 includes a server pending result manager (a server PRM) 570. The server PRM 570, in cooperation with a client pending result manager (a client PRM) 575, maintains pending result fields in the data set and provides intermediate and final results for pending result fields. A pending result field may be any data set field whose value cannot be determined at the time of processing a record containing this field. For example, a pending result field may be an identifier, a page indicator, or a total. FIG. 6 illustrates a sample report with pending results.

Referring to FIG. 6, sample DBMS records 610 are shown. The DBMS records 610 may be obtained by the data acquisition component 555 from one or more databases of the DBMS 230. Each of the DBMS records 610 may have multiple fields. For example, a DBMS record may have a division code 612, a department number 614, an employee number 616, and a product cost 618. These records are passed to the data transformation module 560 which defines a hierarchical structure 620 of a report requested by the user. For example, the user may request to perform a first level grouping of the records 610 by a division code 612 and a second level grouping of the records 610 by a department number 614.

As illustrated in FIG. 6, the report starts with the first level totals: a total for a division "A" (a division code 630 and a total product cost 635) and a total for a division "B" (a division code 640 and a total product cost 645). The report also includes subtotals for various departments within each division. The totals 635 and 645 cannot be determined until the corresponding subtotals are calculated. For example, to compute the total 635 for the division 630, a subtotal for a department "1" (a department number 648 and a subtotal product cost 650), a subtotal for a department "2" (a department number 652 and subtotal product cost 655), and a subtotal for a division "3" (a department number 658 and subtotal product cost 660) must be calculated. Each subtotal cannot be determined until corresponding detail records are processed. Similarly, the total 640 cannot be determined until all subtotals for departments within the division 640 are computed, and these subtotals, in turn, will not be calculated until all corresponding detail records are processed.

A final result set (e.g., a report) may begin with a total followed by corresponding subtotals. Each subtotal is usually followed by several pages of detail records. That is, the page with the subtotal 650 cannot be completely built until DBMS records 610 identified by division "A" and department "1" are processed. Similarly, the page with the total 635 cannot be completely built until all DBMS records 610 identified by division code "A" and any department codes are processed.

To avoid delaying the building process of a final result set and to reduce the delivery time of the final result to the user, the page with a field having a value that requires further determination is displayed before this value is actually calculated. For example, the first page is displayed right away with the total 630 marked as a pending result field (e.g., the total field 635 may have a notation "[waiting . . . ]"). When the value for the pending result field 635 is computed, the field 635 is updated with this computed value. Alternatively, the pending result field may be periodically updated with intermediate values. Each intermediate value may represent a total product cost for detail records processed at the time of update.

In one embodiment, a page indicator identified as a pending result field is displayed to the user. The page indicator notifies the user of the number of pages that are currently available for display. For example, if at the time the user views the first page of the report, 16 pages have been built, the user may see a message (e.g., "page 1 of 16+") which notifies the user of how many pages are currently available. As more pages are built, the value of the page indicator increases.

Returning to FIG. 5, the data flow service 220 maintains information about all pending result fields in the result set, including current value and status information of each pending result field. The status of the pending result field may be, for example, pending (e.g., initialized but a value has not been determined yet), incomplete, complete, unknown, etc. The server PRM 570 provides the current value and status information to the client PRM 575 which updates the pending result field with its intermediate or final value.

In one embodiment, the client PRM 575 triggers a request to the server PRM 570 for a current value of the pending result field. In one embodiment, the request is explicit. That is, the request may be sent upon the occurrence of certain user online activity (e.g., the user requests to view the page with a pending result field). Alternatively, the request may be sent periodically. For example, the client PRM 575 may be configured to request the current value of the pending result field over predefined periods of time when the browser is idle. In yet another embodiment, the request may be included in already occurring communication between the client 505 and the data flow service 220, thereby minimizing the network traffic.

In response to the request triggered by the client PRM 575, the server PRM 570 sends back a current value and a status of the pending result field. Depending on the status and the user request, the client PRM 575 either updates the pending result field with an intermediate value or waits for a final value.

In one embodiment, the data processed by the data flow service 220 is saved in the DFS cache 225. The pending result fields are marked and are saved in the cache with either their intermediate values or without any value. When a final value (and possibly an intermediate value) for each pending result field becomes available, the DFS cache 225 is updated with this value. Accordingly, if another user requests the same result set after final values for all pending result fields are determined, the complete result set with finalized values will be retrieved from the DFS cache 225 for a subsequent display to the user.

Figure 7:
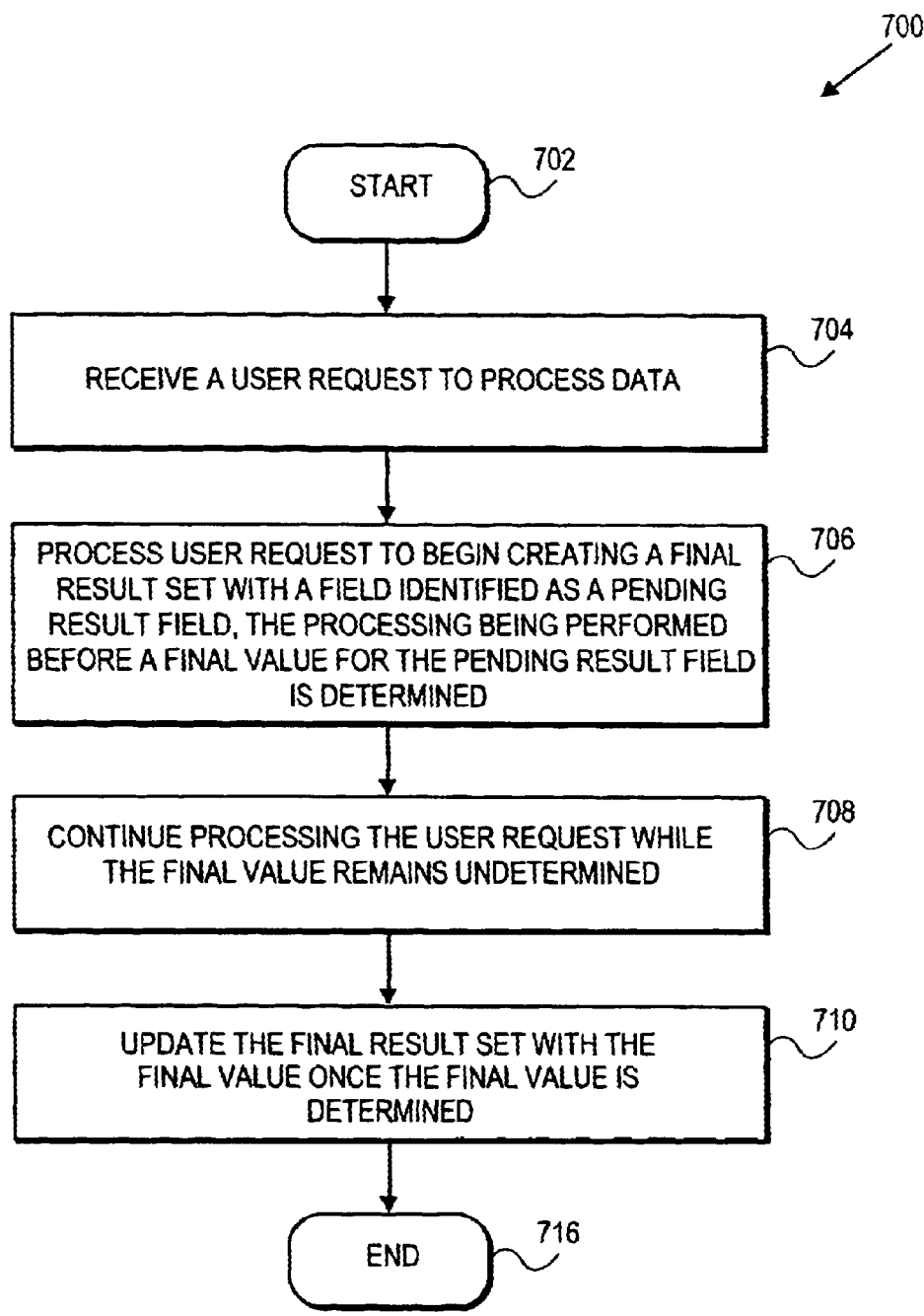
FIG. 7 is a flow diagram of one embodiment of a process for producing a data set with pending results.

FIG. 7 is a flow diagram of one embodiment of a process for creating a data set with pending results. The process is performed by processing logic, which may comprise hardware, software, or a combination of both. The processing logic may be in either or both of client 505 and data flow service 220, or partially or entirely in a separate device and/or system(s).

Referring to FIG. 7, the process begins with receiving a user request to process data (processing block 704). In one embodiment, the user request identifies a plan to be used for processing the data. Next, processing logic in the data flow service 220 processes the user request to begin creating a final result set (processing block 706). The created portion of the final result set contains a field identified as a pending result field. In one embodiment, the pending result field is a total. In alternate embodiments, the pending result field may be a page indicator notifying the user about available pages of the final result set, an identifier, or any other field whose value is determined later in the process of building the final result set.

The processing of the user request includes initial processing of data and subsequent transformation of partially processed data. The initial processing results in the creation of a portion of an initial result set containing the pending result field. The initial processing is performed before a final value for the pending result field is determined. In one embodiment, the initial processing includes grouping of a data set obtained from the DBMS 230. The grouping process is described in greater detail below.

The transformation results in the creation of a portion of a final result set. Similarly, the transformation is performed before the final value for the pending result field is determined. In addition, the transformation is performed before the initial processing is completed. In one embodiment, the transformation includes pagination of the initial data set. The pagination process is described in more detail below.

At processing block 708, processing logic in the data flow service 220 continues processing the user request while the final value for the pending result filed remains undetermined. In one embodiment, the pending result field is displayed with an indicator notifying the user that the final value will be determined at a later time (e.g., a notation "[waiting . . . ]"). Alternatively, the pending result field is displayed with an intermediate value until the final value is determined. The intermediate value may be periodically updated. For example, a page indicator is updated over certain intervals to reflect a change in the number of generated pages.

In one embodiment, processing logic in the data flow service 220 maintains status information for each pending result field and sends the status information and a current value of the pending result field to the client. Processing logic in the client 505, in turn, sends a request for the status and the current value to the server, receives the requested information from the server, and updates the pending result field with the current value.

Afterwards, at processing block 710, once a final value is determined, the final result set is updated with the final value of the pending result field. As a result, building of the final result set and distributing a partially built result set to the user can begin immediately after receiving a user request, without waiting for final values of pending result fields, thereby improving performance and reducing the delivery time of the final result to the user.

In one embodiment, as pages of the final result set are built, they are saved in the DFS cache 225, including pages with fields marked as pending result fields. Once a final value of any pending result field becomes available, a cache entry is made to update the pending result field with its final value. If another user requests the same result set, the DFS cache 225 is accessed to retrieve the complete result set to the user.

Pipelined Processing of Data

Figure 8:
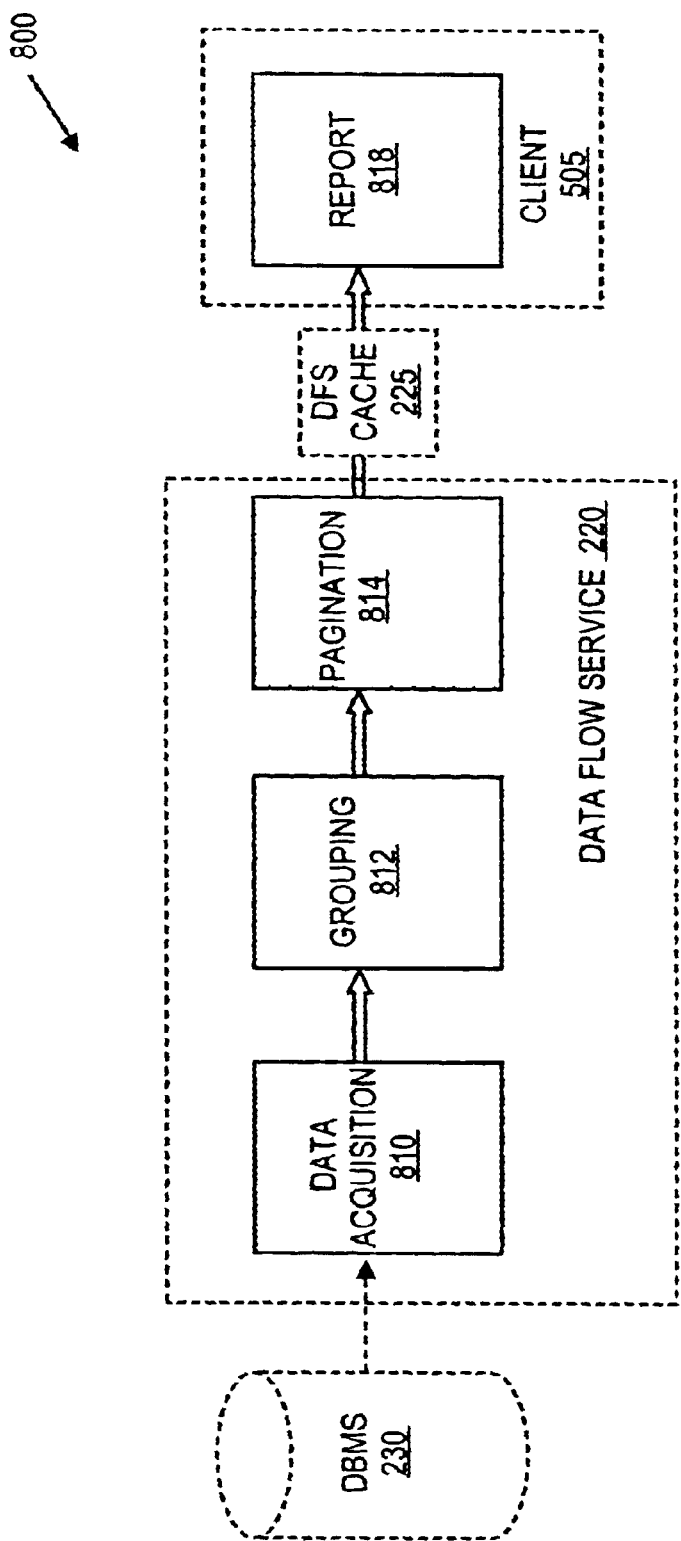
FIG. 8 is a block diagram of one embodiment of a system for pipelined processing of data.

FIG. 8 is a block diagram of one embodiment of a system for pipelined processing of data. Pipelined processing is divided into a number of independent stages. Each stage performs a preassigned task. The process flows from one stage to another in a predefined order. The relationship between the stages can be characterized as the relationship between producers and consumers. As soon as the first stage produces some output, the second stage begins processing ("consuming") this output and producing its own output, which is, in turn, processed ("consumed") by the next stage. The stages do not have to wait until the previous stage completes. This independent, pipelining nature of processing data improves performance and increases the speed of data distribution to the users.

Referring to FIG. 8, four stages are shown. These stages are a data acquisition stage 810, a grouping stage 812, a pagination stage 814, and a report stage 818. Three of these stages are on the data flow service 220, and one stage is on the client 505. The data flow service 220, the client 505, and the DBMS 230 are described in detail in conjunction with FIG. 5.

Data acquisition 810 obtains data from one or more databases of the DBMS 230. As described above, a wide variety of data sources may be used to supply data to the data flow service 220. Grouping 812 defines the hierarchical structure of data. The hierarchical structure may include one or more levels of grouping and summaries in a final result set. For example, the records in the report may be grouped by state, then by county, and further by city, with corresponding summaries at each level. Pagination 814 creates pages of the final result set by defining what records appear on each page. In one embodiment, after the data is grouped and paginated, it is saved in the DFS cache 225 for use in the processing of subsequent user requests as described in greater detail above.

Figure 9:
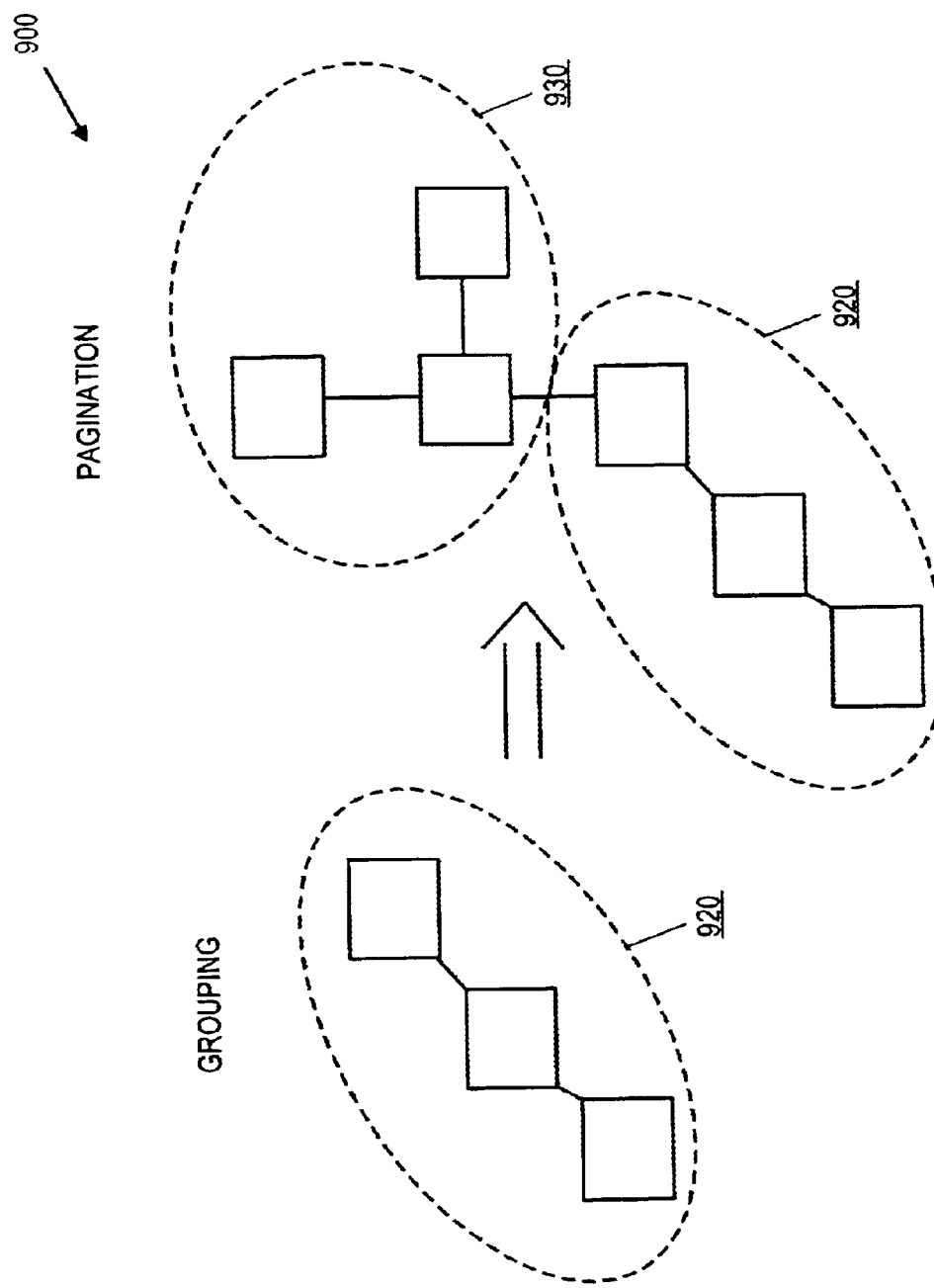
FIG. 9 illustrates grouping and pagination of data during pipelined processing.

FIG. 9 illustrates the grouping and pagination of data. At the grouping stage, the hierarchical data 920 is created. That is, the records received from the DBMS 230 are grouped according to the user request. The pagination stage receives the hierarchical data 920 and adds a page index 930 to it. The page index 930 is created to define what records are placed on each page of the final result set. In one embodiment, the index 930 may define first and last records for each page of the hierarchical data 920.

Returning to FIG. 8, the last stage is a report stage 505 that displays a final result set (e.g., a report, a chart, a spreadsheet, etc.) to the user. The pagination process, as well as the independent nature of pipelined processing of data, enables the user to asynchronously retrieve pages of the final result set. That is, the user may view one page at a time, and the data flow service 220 does not need to transmit the entire result set to the client. For example, the user may randomly select pages for viewing (e.g., the user may start with page 1, move to page 999, and then go back to page 455). The report stage is the only stage that is performed on the client 505. The actual building of the final result set is done on the data flow service 220, thereby improving performance and minimizing the amount of data transmitted from the data flow service 220 to the client 505.

In one embodiment, a page indicator is displayed to notify the user about pages that are available to be accessed. The page indicator is periodically updated to reflect that more pages are built by the data flow service 220. In addition, the user may be able to request viewing the last available page, previous or next page, first page, etc. As described above, the page indicator may be identified as a pending result field.

In one embodiment, the pending result mechanism allows the grouping stage 812 to create the hierarchical data before values of certain fields in the final result set are finalized. That is, instead of waiting until a final value of a field located in the beginning of the result set is computed, the data can be grouped and paginated without any delay. As described above, pending result fields are displayed to the user either with a current intermediate value or with a notation indicating that the result will be available at a later time. As soon as the final result is determined, it is displayed to the user, replacing the intermediate value or the pending result notation.

Figure 10:
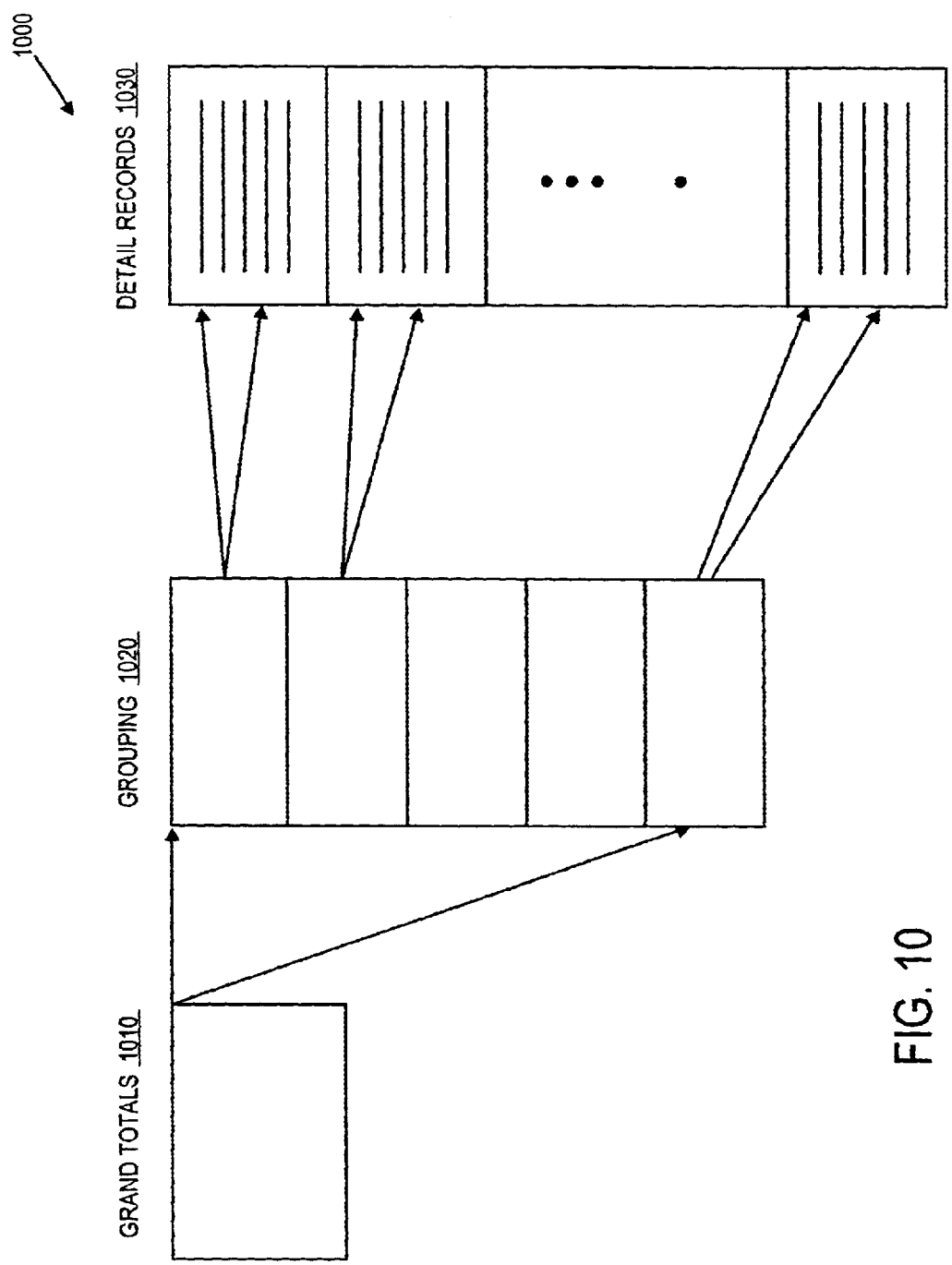
FIG. 10 illustrates the hierarchical structure of a data portion of a sample report with a pending result field.

FIG. 10 illustrates the hierarchical structure of a data portion of a sample report with a pending result field. Assuming that the user requested to begin the report with a grand total 1010, the grand total 1010 must be placed at the top of the hierarchical structure 1000. However, the grand total 1010 cannot be computed until all detail records 1030 are processed. Instead of waiting for the grand total 1010 to be calculated, the grand total 1010 is placed at the top of the hierarchy 1000 with a notation indicating that its value is pending. The process then proceeds to the next hierarchical level, i.e. grouping 1020. Grouping 1020 may be, for example, grouping by state. As shown by the pointers, each state in grouping 1020 references to detail records in the next level of the hierarchy 1000. In one embodiment, the pending result mechanism is used to create references from each record in grouping 1020 (a parent) to multiple detail records (multiple children).

The detail records 1030 may contain detail information for each state, e.g. values in gross of each department store in the state. It should be noted that although only one level of grouping is shown, the hierarchy 1000 may have multiple levels of grouping, e.g., groupings by state, city, department store, etc. After the hierarchy 1000 is created, it is passed to the pagination stage at which the page index is generated. Further, the paginated hierarchical data is passed to the report stage. As described above, in one embodiment, one page at a time is passed to the report stage for a display to the user.

Figure 11:
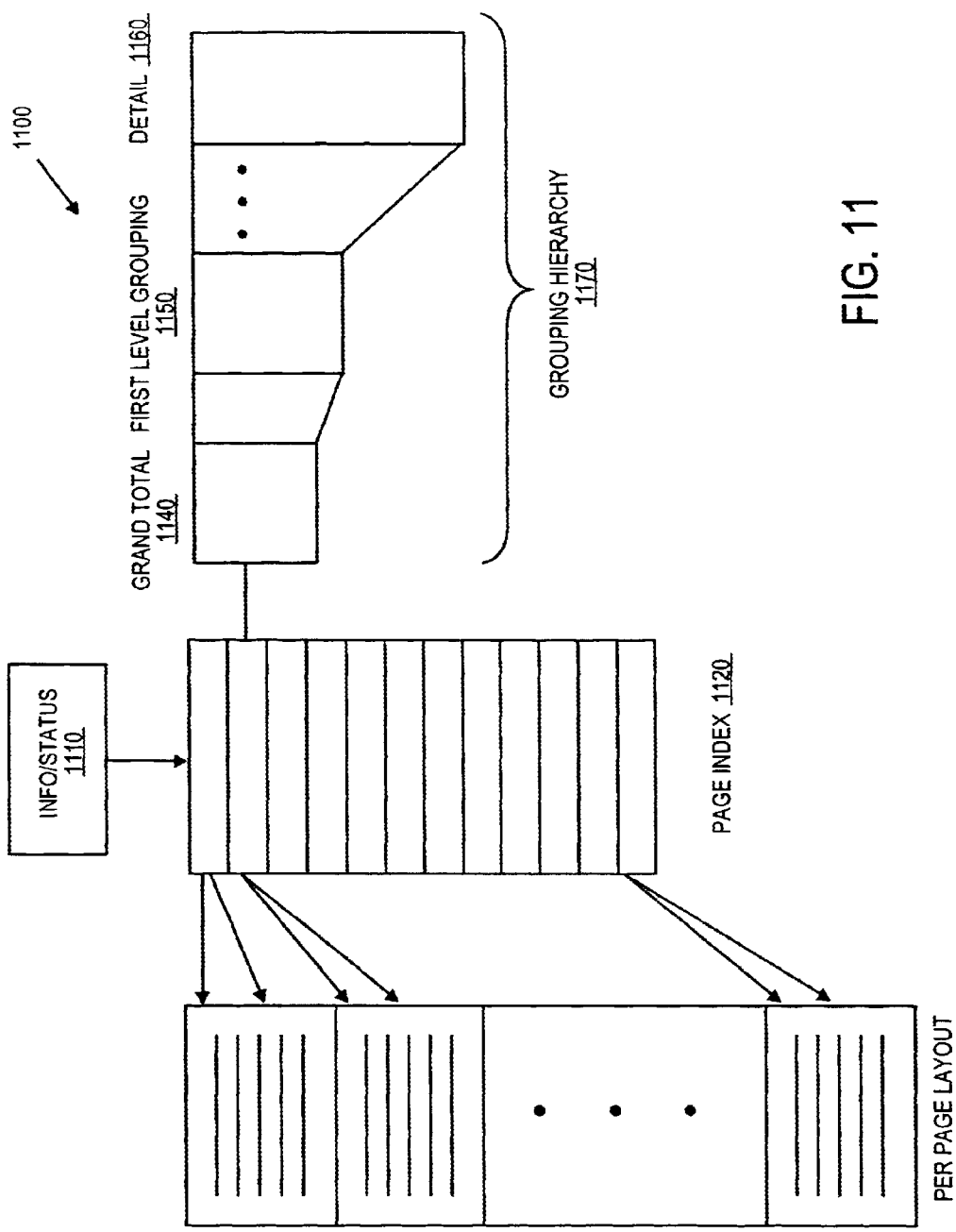
FIG. 11 illustrates the hierarchical structure of a sample report.

FIG. 11 illustrates the hierarchical structure of a sample report. As described above, user may design a new plan or select an existing plan which is executed by the data flow service 220. During execution, the user is provided with information and status of various stages of pipelined processing, e.g. status of grouping and pagination, how many pages are built, etc. This information is represented by the top object, i.e., info/status 1110.

Object 1120 is a page index. The page index refers to a detailed layout of each page, i.e. per page layout 1130. In one embodiment, when the user designs a plan, the user can use very detailed page layouts. For example, the user can specify a certain place on each page for a logo, a particular length and width of each page, various colors for fonts, etc. Depending on the above features, each page may contain a certain number of records. Per-page layout 1130 defines record numbers of records that are placed on each page.

Grouping hierarchy 1170 provides various levels of the hierarchical data. Grouping hierarchy 1170 may include a grand total 1140, one or multiple levels of grouping 1150, and the actual detailed data 1160.

In one embodiment, the user can still be designing or modifying the plan while the data is being processed at various stages of pipelined processing. For example, the user may decide, after the processing begins, to add a new logo on each page, thereby making a report longer and changing a layout of each page. Caching and pipelined reporting techniques enable the user to make these modifications without re-executing the plan from the beginning.

Figure 12:
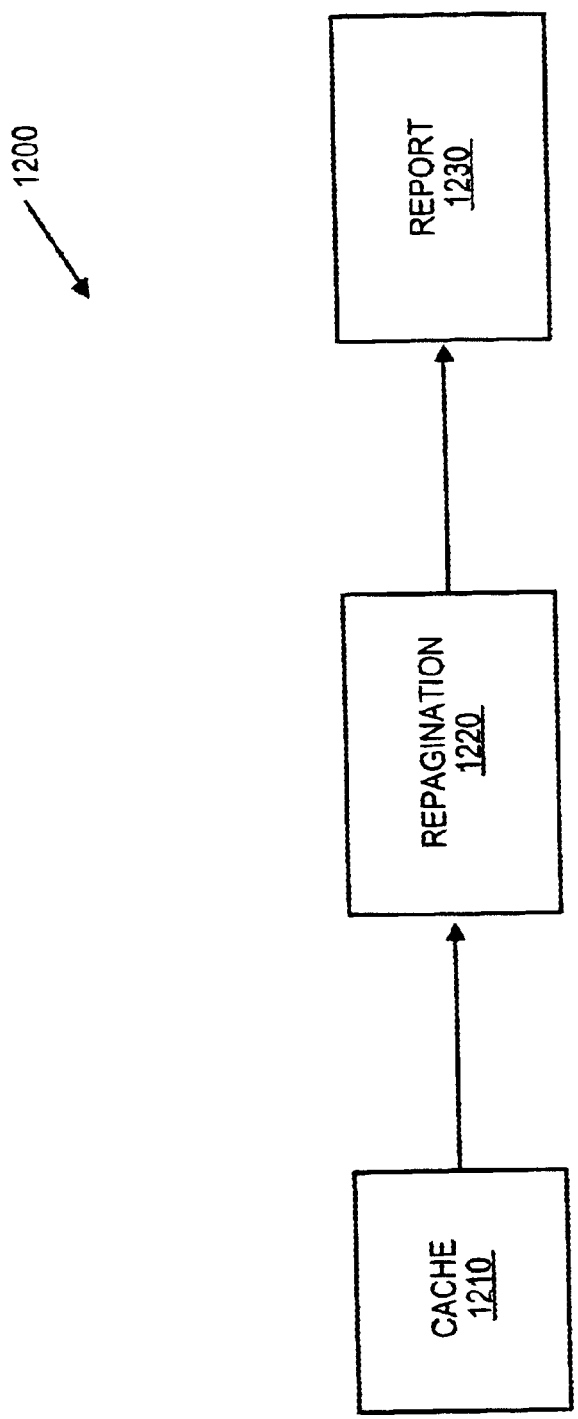
FIG. 12 is a block diagram of one embodiment of a process flow for pipelined processing of data using caching.

FIG. 12 is a block diagram of one embodiment of a process flow for pipelined processing of data using caching. Cache 1210 is a data flow service cache which stores the result set created in the data flow service 220. That is, as the hierarchical data is being paginated, it is saved in the cache 1210 and is passed to the client 505 for a display to the user. If the user changes a layout of the final result set, the data flow result set is retrieved from the cache 1210 and modified according to the changes requested by the user. The user request does not need to be re-executed entirely, and it is only processed at the necessary stages. When only the layout of the final result set changes, the data does not go through the data acquisition stage and the grouping stage. Instead, the process begins at the pagination stage. Specifically, the data flow result set is retrieved from the cache 1210, repaginated by the repagination module 1220 and passed to the report stage 1230 for a display to the user.

Figure 13:
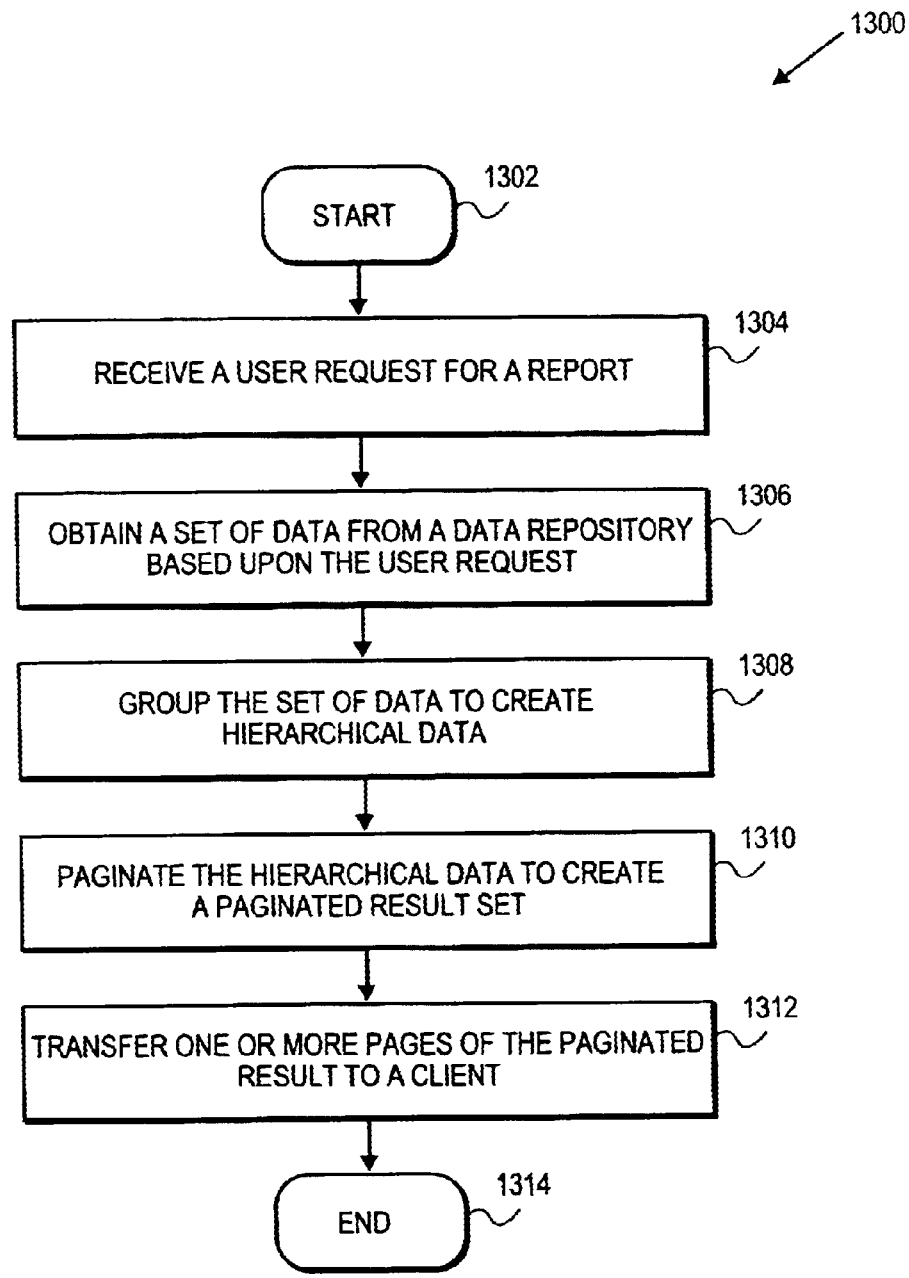
FIG. 13 is a flow diagram of one embodiment of a process of pipelined processing of data.
Figure 14:
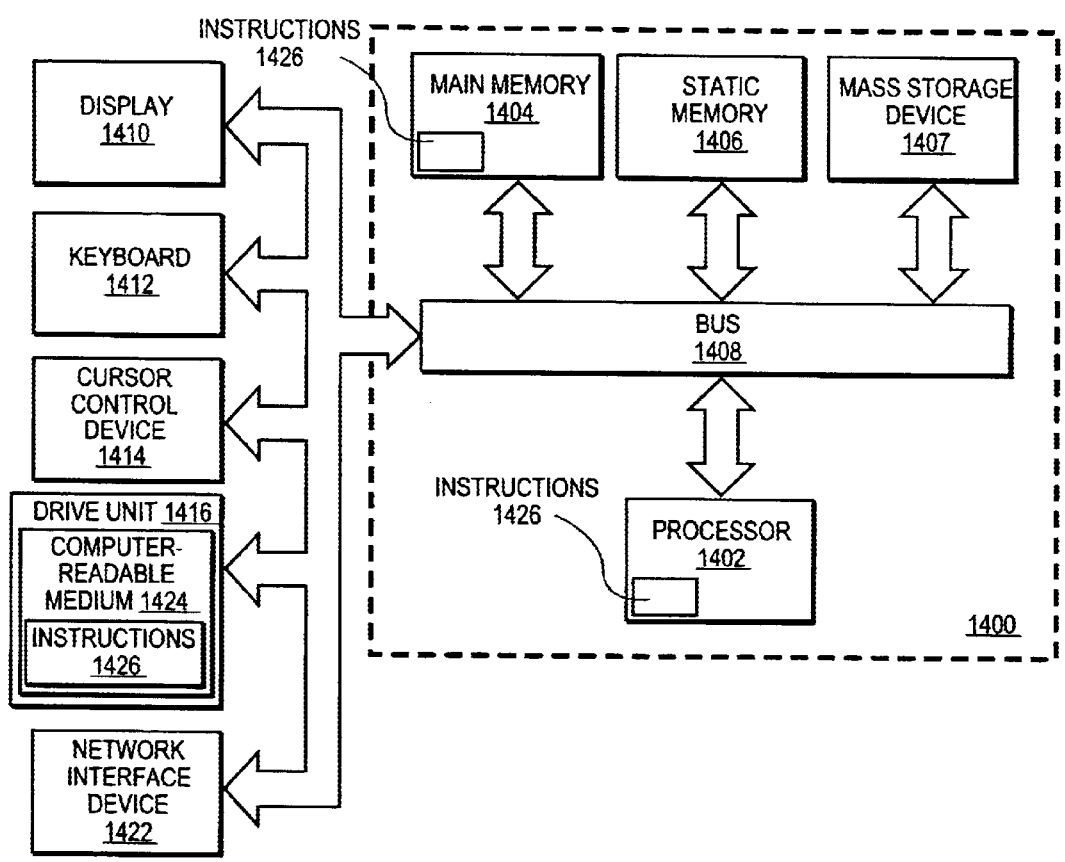
FIG. 14 is a block diagram of one embodiment for an architecture of a computer system.

FIG. 13 is a flow diagram of one embodiment of a process of pipelined processing of data. The process is performed by processing logic, which may comprise hardware, software, or a combination of both. The processing logic may be in either or both of client 505 and data flow service 220, or partially or entirely in a separate device and/or system(s).

Referring to FIG. 13, the process begins with receiving a user request to process data (processing block 1304). In one embodiment, the user request identifies a plan to be used for processing the data. At processing block 1306, processing logic in the data flow service 220 obtains a set of data from a data storage based upon the user request. As described above, the set of data may be obtained from one or more databases of the DBMS 230. Next, processing logic in the data flow service 220 groups the set of data to create hierarchical data (processing block 1308). In one embodiment, grouping of data begins as soon as only a portion of data is obtained from the data storage.

At processing block 1310, processing logic in the data flow service 220 paginates the grouped set of data to create a paginated result set. The pagination of data begins before the grouping completes. That is, the pagination of data may begin as soon as a portion of data is grouped. In one embodiment, the paginated result set is stored in a cache. Further, one or more pages of the paginated result set are transferred to the client 505 (processing block 1312). In one embodiment, a page which includes a total value field (a pending result field) is transferred to the client before its final value is determined. Subsequently, when the final value becomes available, the total value field is updated. As a result, pages with pending result fields are built early in the process and do not delay delivery of data to the user. The pending result mechanism is described in greater detail above.

In one embodiment, the user is able to randomly access pages of the final result set. A page indicator is provided to notify the user about the pages that are available to be accessed. Accordingly, only the pages that are requested by the user are passed to the client, thereby avoiding transmitting unnecessary data the client 505. In addition, transmitting the data to the client 505 after this data went through the grouping and pagination stages improves performance and minimizes the amount of transmitted data between the data flow service 220 and the client 505.

Computer System Architecture

FIG. 1400 shows a diagrammatic representation of machine in the exemplary form of a computer system 1400 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1400 includes a processor 1402, a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a cursor control device 1414 (e.g., a mouse), a disk drive unit 1416, a signal generation device 1420 (e.g., a speaker) and a network interface device 1422.

The disk drive unit 1416 includes a computer-readable medium 1424 on which is stored a set of instructions (i.e., software) 1426 embodying any one, or all, of the methodologies described above. The software 1426 is also shown to reside, completely or at least partially, within the main memory 1404 and/or within the processor 1402. The software 1426 may further be transmitted or received via the network interface device 1422. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a method and apparatus for processing data using multi-tier caching have been described.

What is claimed is:

1. A method for processing data using multi-tier caching, the method comprising:

receiving a first user request to process data, the first user request including at least one data parameter and being indicative of a plurality of tiers to be used in processing the data;

searching cache memories of the plurality of tiers until finding a cache memory that stores a parameterized result set associated with the at least one data parameter; and processing the parameterized result set to create a final result set.

2. The method of claim 1 further comprising dynamically placing the parameterized result set in a cache upon processing a second user request at a corresponding tier, the second user request being processed prior to the first user request and including the at least one parameter specified by the user.

3. The method of claim 1 further comprising:

processing the user request at a tier whose cache did not contain the at least one data parameter included in the first user request;

creating the parameterized result set at the tier; and storing the parameterized result set with the at least one data parameter in a corresponding cache for use in processing of subsequent user requests.

4. The method of claim 1 wherein the plurality of tiers includes a first tier, a second tier, and a third tier.

5. The method of claim 4 wherein the first tier is one or more processes running on a data flow service, the second tier is one or more processes running on a web server, and the third tier is one or more processes running on a client.

6. The method of claim 1 further comprising:

receiving data identifying one or more pages of the final result set from the user; and displaying the one or more pages of the final result set to the user.

7. The method of claim 1 wherein each cache is accessible by a predefined group of users.

8. The method of claim 1 wherein the user request identifies a plan to be used for creating the final result set.

9. A method for processing data using multi-tier caching, the method comprising:

receiving a user request to process data, the user request including at least one data parameter and being indicative of a plurality of tiers to be used in processing the data;

determining that the at least one data parameter is not stored in any cache of the plurality of tiers, each of the plurality of tiers having a corresponding cache and performing a task selected from a group consisting of data retrieval, data transformation and data presentation;

processing the user request at each of the plurality of tiers using the at least one data parameter to create a plurality of result sets, each result set corresponding to a distinct one of the plurality of tiers;

storing the result set with the at least one data parameter in a corresponding cache for use in processing of subsequent user requests; and displaying a final result set to the user.

10. The method of claim 9 further comprising:

receiving a second user request to process data, the second user request including the at least one data parameter;

searching caches of the plurality of tiers until finding a result set associated with the at least one data parameter; and utilizing the result set to produce the final result set.

11. The method of claim 9 wherein the plurality of tiers includes a first tier, a second tier, a third tier.

12. The method of claim 11 wherein the first tier is one or more processes running on a data flow service, the second tier is one or more processes running on a web server, and the third tier is one or more processes running on a client.

13. An apparatus for processing data using multi-tier caching, the method comprising:

means for receiving a first user request to process data, the user request including at least one data parameter and being indicative of a plurality of tiers to be used in processing the data;

means for searching cache memories of a plurality of tiers until finding a cache memory that stores a parameterized result set associated with the at least one data parameter; and means for creating a final result set based upon the parameterized result set.

14. The apparatus of claim 13 further comprising means for dynamically placing the parameterized result set in a cache upon processing a second user request at a corresponding tier, the second user request being processed prior to the first user request and including the at least one parameter specified by the user.

15. The apparatus of claim 13 further comprising:

means for processing the user request at a tier whose cache did not contain the at least one data parameter included in the user request; and means for creating the parameterized result set at the tier, the parameterized result set being stored with the at least one data parameter in a corresponding cache for use in processing of subsequent user requests.

16. The apparatus of claim 13 wherein the plurality of tiers includes a first tier, a second tier, and a third tier.

17. The apparatus of claim 13 wherein the first tier is one or more processes running on a data flow service, the second tier is one or more processes running on a web server, and the third tier is one or more processes running on a client.

18. The apparatus of claim 13 further comprising:

means for receiving data identifying one or more pages of the final result set to from user; and means for displaying the one or more pages of the final result set to the user.

19. The apparatus of claim 13 wherein each cache is accessible by a predefined group of users.

20. The apparatus of claim 13 wherein the user request identifies a plan to be used for creating the final result set.

21. A system for processing data using multi-tier caching, the system comprising:

a data flow service to receive a user request including at least one data parameter, to determine that a first-tier cache associated with the data flow service does not store a data flow result set with the at least one data parameter, to obtain an initial result set from a database management system, to generate a data flow result set based upon the at least one data parameter, and to store the data flow result set with the at least one data parameter in the first-tier cache for use in processing of subsequent user requests;

a web server, coupled to the data flow service, to determine that a second-tier cache associated with the web server service does not store a web server result set with the at least one data parameter, to generate a web server result set based upon the data flow result set, and to store the web server result set with the at least one data parameter in the second-tier cache for use in processing of subsequent user requests; and a client, coupled to the web server over a network, to issue the user request with the at least one data parameter, to determine that a third-tier cache associated with the client does not store a final result set with the at least one data parameter, to create a final result set using the web server result set, and to store the final result set with the at least one data parameter in the third-tier cache for use in processing of subsequent user requests.

22. A computer readable medium comprising instructions, which when executed on a processor, cause the processor to perform a method for processing data using multi-tier caching, the method comprising:

receiving a first user request to process data, the first user request including at least one data parameter and being indicative of a plurality of tiers to be used in processing the data;

searching cache memories of a plurality of tiers until finding a cache memory that stores a parameterized result set associated with the at least one data parameter; and processing the parameterized result set to create a final result set.

23. A computer readable medium comprising instructions, which when executed on a processor, cause the processor to perform a method for processing data using multi-tier caching, the method comprising:

receiving a user request to process data, the user request including at least one data parameter and being indicative of a plurality of tiers to be used in processing the data;

determining that the at least one data parameter is not stored in any cache of the plurality of tiers, each of the plurality of tiers having a corresponding cache and performing a task selected from a group consisting of data retrieval, data transformation and data presentation;

processing the user request at each of the plurality of tiers using the at least one data parameter to create a plurality of result sets, each result set corresponding to a distinct one of the plurality of tiers;

storing the result set with the at least one data parameter in a corresponding cache for use in processing of subsequent user requests; and displaying a final result set to the user.

* * * * *